(12) United States Patent
Merugu et al.

(10) Patent No.: US 9,141,966 B2
(45) Date of Patent: Sep. 22, 2015

(54) OPINION AGGREGATION SYSTEM

(75) Inventors: Srujana Merugu, Gurgaon (IN); Arun Shankar Iyer, Bangalore (IN); Ashwin Kumar V. Machanavajjhala, Millbrae, CA (US); Sathiya Keerthi Selvaraj, Cupertino, CA (US); Philip L. Bohannon, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 776 days.

(21) Appl. No.: 12/646,574

(22) Filed: Dec. 23, 2009

(65) Prior Publication Data

US 2011/0153542 A1 Jun. 23, 2011

(51) Int. Cl.
| | | |
|---|---|---|
| G06F 9/44 | (2006.01) | |
| G06N 7/02 | (2006.01) | |
| G06N 7/06 | (2006.01) | |
| G06Q 30/02 | (2012.01) | |
| G06K 9/62 | (2006.01) | |
| G06N 7/00 | (2006.01) | |
| G06N 5/04 | (2006.01) | |
| G06Q 10/06 | (2012.01) | |
| G06Q 50/00 | (2012.01) | |

(52) U.S. Cl.
CPC .......... *G06Q 30/0203* (2013.01); *G06K 9/6277* (2013.01); *G06K 9/6278* (2013.01); *G06N 5/04* (2013.01); *G06N 7/005* (2013.01); *G06Q 10/06* (2013.01); *G06Q 50/01* (2013.01)

(58) Field of Classification Search
USPC ........................................................ 706/52
See application file for complete search history.

(56) References Cited

U.S. PATENT DOCUMENTS

2004/0133393 A1* 7/2004 Misium ......................... 702/181
2004/0225577 A1* 11/2004 Robinson ........................ 705/26
2009/0106307 A1* 4/2009 Spivack .................... 707/103 R

OTHER PUBLICATIONS

Jordan, Michael and Robert A. Jacobs Hierarchical Mixtures of Experts and the EM Algorithm MIT Artificial Intelligence Laboratory, 1993. [Online] Downloaded Jul. 18, 2012 http://www.bitsavers.org/pdf/mit/ai/aim/AIM-1440.pdf.*
Evans, Chris "Unravelling the Msyteries of the Oracle: The Voice of the Experts" Berkeley Electronic Press 2007. [Online] Downloaded Jul. 18, 2012 http://law.bepress.com/cgi/viewcontent.cgi?article=1011&context=unswwps-flrps.*
Zhai, CHengXiang, Atulya Velivelli and Bei Yi. "A Cross-Collection Mixture Model for Comparative Text Mining" KDD Aug. 2004. [Online] Downloaded Jul. 18, 2012 http://delivery.acm.org/10.1145/1020000/1014150/p743-zhai.pdf?ip=151.207.242.4&acc=ACTIVE%20SERVICE&CFID=99650501&CFTOKEN=87033138&_acm_=1343601410_e4af.*

* cited by examiner

*Primary Examiner* — Ben Rifkin
(74) *Attorney, Agent, or Firm* — Brinks Gilson & Lione (57) ABSTRACT

A system is disclosed for obtaining and aggregating opinions generated by multiple sources with respect to one or more objects. The disclosed system uses observed variables associated with an opinion and a probabilistic model to estimate latent properties of that opinion. With those latent properties, the disclosed system may enable publishers to reliably and comprehensively present object information to interested users.

8 Claims, 7 Drawing Sheets

FIG. 1

| Source | Object | Opinion: Textual Description |
|---|---|---|
| A | 1 | RestaurantName1, Middle Eastern; Sunnyvale, CA 94056 |
| A | 2 | RestaurantName2, Thai; Mountain View, CA 94041 |
| B | 1 | <tr><td>Mid Eastern Cuisine: </td><td>RestaurantName1</td><td>Sunnyvale, CA 94056</td></tr> |
| B | 3 | <tr><td>Pizza: </td><td>RestaurantName3</td><td>Sunnyvale, CA 94056</td></tr> |
| C | 2 | Best Thai of Mountain View: RestaurantName2 |

Algorithm 1 Incremental EM algorithm input:
$S_{ACT} \leftarrow$ sources with supervision on $X_i^{lat}$
$E_{ACT} \leftarrow$ objects with supervision on $Y_j^{lat}$

Repeat

$O_{ACT} \leftarrow \{O_k \mid I(k) \in S_{ACT} \vee J(k) \in E_{ACT}\}$ // Update the active set of opinions // Update $\tilde{P}(U_k/X_i^{lat})$, and $\tilde{P}(V_k/Y_j^{lat})$ $\tilde{P}(U_k = u/X_i^{lat} = x) \propto P(U_k = u/X_i^{lat} = x, X_i^{obs}) \times \exp\left[\int_v \tilde{P}(V_k = v) \log P(O_k/V_k = v, U_k = u) dv\right]$ $\tilde{P}(V_k = v/Y_j^{lat} = y) \propto P(V_k = v/Y_j^{lat} = y, Y_j^{obs}) \times \exp\left[\int_u \tilde{P}(U_k = u) \log P(O_k/U_k = u, V_k = v) du\right]$ $S_{ACT} \leftarrow \{s_i \mid k(i,j) \in O_{ACT}\}$ // Update the active set of sources // Update $\tilde{P}(X_i^{lat})$, $\theta$ $\tilde{P}(X_i^{lat} = x) \propto P(X_i^{lat} = x/\theta) \times \exp\left[\sum_{k\mid I(k)=i} \int_u \tilde{P}(U_k = u) \log P(U_k = u/X_i^{lat} = x, X_i^{obs}) du\right]$ $\theta^* \leftarrow \underset{\theta}{\arg\max} \sum_i \int_x \tilde{P}(X_i^{lat} = x) \log P(X_i^{lat} = x/\theta) dx$ $E_{ACT} \leftarrow \{e_i \mid k(i,j) \in O_{ACT}\}$ // Update the active set of objects // Update $\tilde{P}(Y_j^{lat})$, $\eta$ $\tilde{P}(Y_j^{lat} = y) \propto P(Y_j^{lat} = y/\eta) \times \exp\left[\sum_{k\mid J(k)=j} \int_v \tilde{P}(V_k = v) \log P(V_k = v/Y_j^{lat} = y, Y_j^{obs}) dv\right]$ $\eta^* \leftarrow \underset{\eta}{\arg\max} \sum_j \int_y \tilde{P}(Y_j^{lat} = y) \log P(Y_j^{lat} = y/\eta) dy$

OPINION AGGREGATION SYSTEM

BACKGROUND

1. Technical Field

The present description relates generally to on-line communities and, more particularly, but not exclusively, to aggregating agent generated opinions in on-line communities.

2. Related Art

The availability of powerful tools for developing and distributing Internet content has led to an increase in information, products, and services offered through the Internet, as well as a dramatic growth in the number and types of consumers using the Internet. With this increased consumer traffic, the number of community driven systems provided through the Internet, such as rating systems, collaborative information resources and databases, or other information resources, has also grown dramatically.

On-line collaborative communities and rating systems, such as Yahoo! Answers, Yahoo! Movies, Wikipedia, and other information resources may receive, process, and/or publish agent generated opinions and other generated information about topics and objects of interest. Systems that aggregate agent generated opinions associated with a common object may provide useful and convenient information to users.

However, the collaborative communities, rating systems, and other community driven systems must often aggregate differing, conflicting, and/or ambiguous opinions from multiple sources. In addition, those multiple sources may present opinions in different ways and in different formats. The differences, conflicts, and/or ambiguities should be aggregated to provide a more reliable consensus aggregate of opinion generation parameters.

BRIEF DESCRIPTION OF THE DRAWINGS

Non-limiting and non-exhaustive descriptions are provided with reference to the following figures. The components in the figures are not necessarily to scale, with an emphasis instead being placed upon illustrating the principles of the invention. Moreover, in the figures, like-referenced numerals designate corresponding parts throughout the different views.

FIG. 5 shows an exemplary incremental EM algorithm the opinion aggregation system may use to infer latent variables associated with an opinion.

DETAILED DESCRIPTION

A system and method, generally referred to as a system, relate generally to opinion aggregation based on a probabilistic model. The principles described herein may be embodied in many different forms. The disclosed systems and methods may provide users with, or allow publishers to provide users with, reliable aggregate opinions associated with an object. For the sake of explanation, the system is described as used in a network environment, but the system may also operate outside of the network environment.

Figure 1:
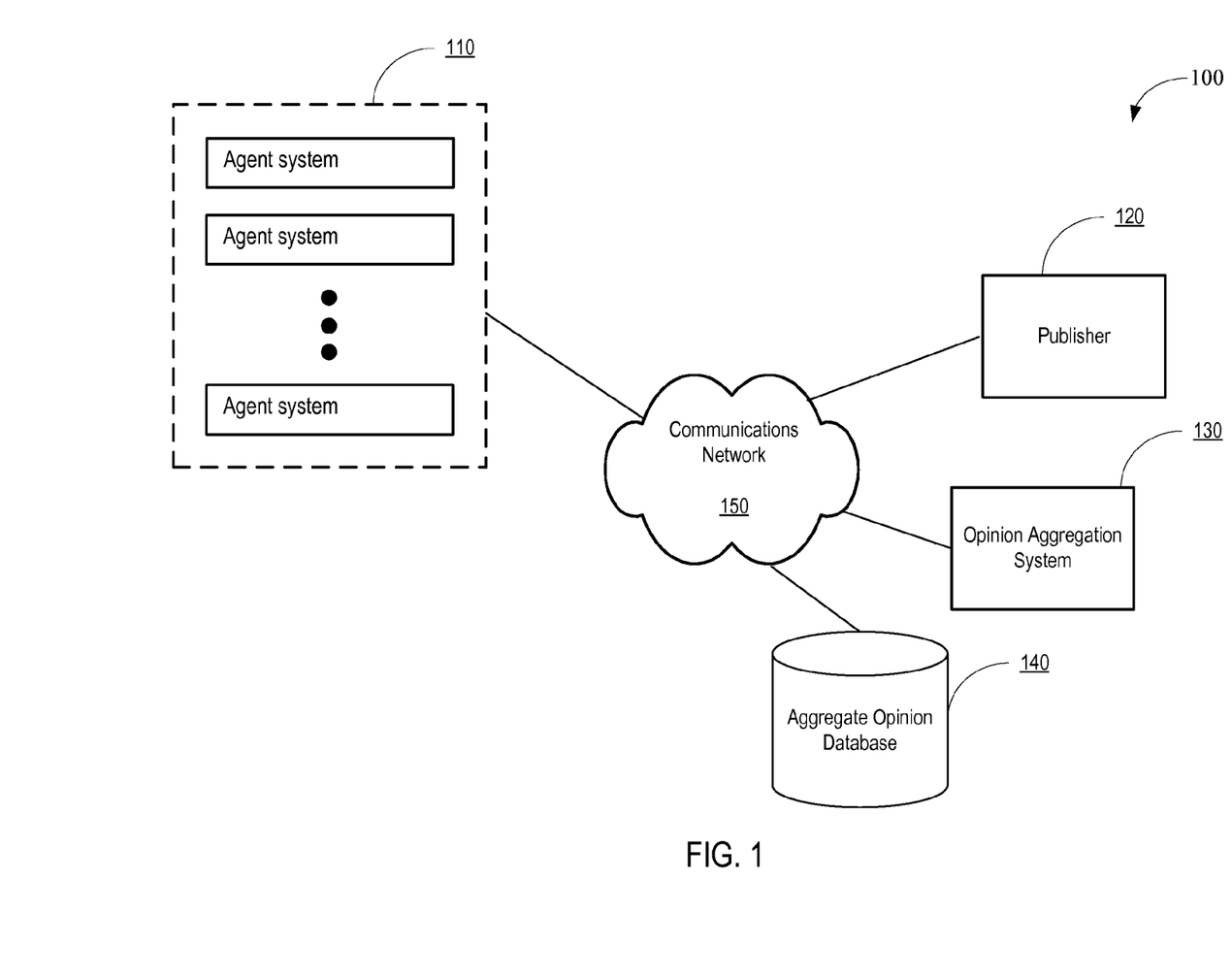
FIG. 1 shows a general architecture of a system for opinion aggregation.

FIG. 1 shows a general architecture 100 of a system for opinion aggregation or reconciliation. The architecture 100 may include agent systems 110, a publisher 120, an opinion aggregation system 130, and an aggregate opinions database 140. The publisher 120 may host one or more opinions related to one or more objects, such as on a Web page. For example, a publisher may host opinions describing and/or rating a movie, book, restaurant, political candidate, sports team, or other topics about which an agent may express an opinion. The opinions may be generated by one or more of the agents systems 110, by the publisher 120, or by an external source. The opinions, as well as information about the object that is the subject of the opinion and about the source hosting the opinion, may also be extracted from other sources, such as from web sites or search engines, using a data extraction system. The publisher 120 may be an on-line database, a web community, web site or other community driven information resource.

The agent systems 110 may generate an opinion associated with one or more of the topics hosted by the publisher 120. The publisher 120 may also host the opinions generated by the agents systems 110. An opinion submitted by the agent system 110 may represent the agent's belief, judgment, opinion, rating, or other conclusion in regards to the object. For example, the opinion may be a user's rating of a movie, such as a numerical value between one (1) and ten (10), a grade between F and A+, a "Yes" or "No", or other mechanism by which a user may express an opinion about a movie or other topic. The opinion may be selected from a pre-defined set of categories, such as "approve", "indifferent," or "disapprove" when opining on a political candidate's foreign policy positions.

In some systems, an agent, or an opinion generated by one of the agent systems 110, may also be an object, such as on web pages that enable an agent to rate another agent, or rate another agent's opinion. In other systems, the object and the opinion may be generated by the agent. For example, community sites such as Yahoo! Answers enable users to generate both the question and the answers, as well as to rate other users' questions and answers. The opinion aggregation system 130 may be configured to generate a truth score associated with the user ratings of the questions and/or of the answers. In a question/answer context such as in Yahoo! Answers, the object may include the question and/or the answer; and the opinion aggregation system 130 may provide reliable and accurate insight into a determination of the usefulness of a question, the relevance of an answer to the question, and/or the trustworthiness of a user for posing or answering questions.

Figure 2:
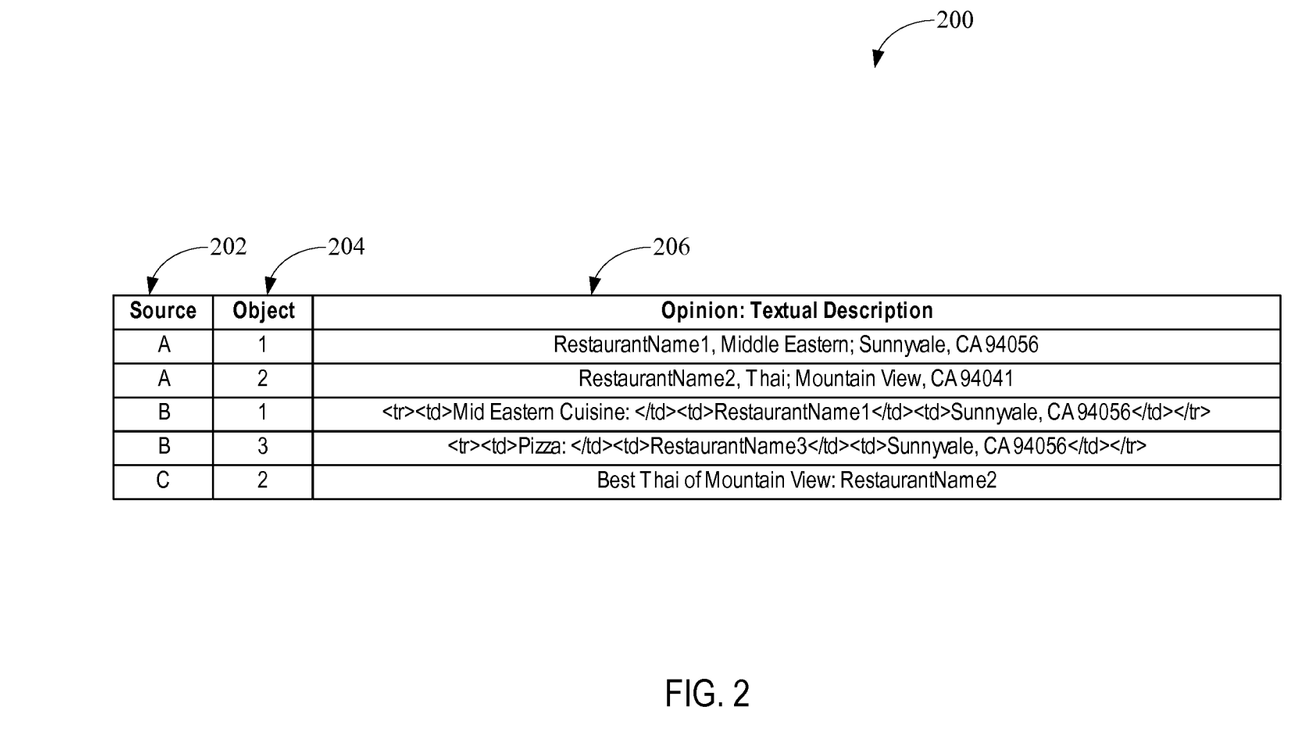
FIG. 2 is a chart showing an example of the relationships between opinions, objects, and sources.

An opinion may also be a textual description of an object. FIG. 2 is a chart 200 showing an example of the relationships between opinions, objects, and sources, where the opinions are text snippets about restaurants extracted from multiple web sources. Column 202 identifies sources of an opinion. Column 204 identifies objects about which an opinion is made. Column 206 identifies the opinions. In this example, the sources are web-pages A, B, and C, the objects are restaurants 1, 2, and 3, and the opinions are textual descriptions.

As shown in the chart 200, the web-pages A, B, and C present the opinions using varying formats. Each restaurant in web-page B is listed, for example, as <tr><td>cuisine:</td><td>name</td><td>address</td></tr>. The pattern or format a source uses to present opinion tokens or other information may be referred to as the presentation bias or source presentation template of the source. The opinion tokens presented by the web site may include attribute tokens (e.g., name, address, cuisine, etc.) and delimiters (e.g., commas, html tags, white spaces, etc) that indicate transitions between attribute tokens. The chart 200 shows that the web-pages A and B each use different formats to present information about the same restaurant 1. The opinion aggregation system 130 is configured to estimate the presentation bias of a source and reconcile and aggregate attributes for objects from conflicting extractions.

For the sake of explanation, the opinion aggregation system 130 is described herein in the context of attribute extraction for which the opinions take the form of text snippets, and of which FIG. 2 is an example. However, it will be appreciated that the models, systems, processes and algorithms discussed herein may be used in other contexts, such as those shown in Table 1.

TABLE 1

| System | Source | Opinion | Entity | Target Property | Source Bias |
| --- | --- | --- | --- | --- | --- |
| Yelp | User | *-Rating | Business | Quality of Service | Varying Scale |
| Delicious | User | Text Tags | Article | Taxonomy Labels | Language/Intent |
| DBLife | University & Faculty Pages | Text Snippets | Database Researchers | Affiliation | Temporal and Presentation Bias |
| Wikimapia | Users | Polygons on Maps | Text Tags | Canonical Labels | Erroneous tags |

The agent system 110 may connect to the publisher 120 via the Internet using a standard browser application. A browser-based implementation allows system features to be accessible, regardless of the underlying platform of the agent system 110. The agent system 110 may be a desktop, laptop, handheld computer, cell phone, mobile messaging device, network enabled television, digital video recorder, such as TIVO® (sold by TiVo, Inc., Alviso, Calif.), automobile, video game system, or other network enabled user client system 110, which may use a variety of hardware and/or software packages. The agent systems 110 may connect to the publisher 120 using a stand-alone application (e.g., a browser via the Internet, a mobile device via a wireless network, or other applications) which may be platform-dependent or platform-independent. Other methods may be used to implement the agent systems 110.

One or more of the agent systems 110 may be an information extraction agent. An extraction agent may employ one or more Hidden Markov Models, Support Vector Machines, Condition Random Fields, or other extraction mechanisms to extract information from Web sites, search engines, or other information sources. The information extracted by the extraction agent may include objects associated with various kinds of named entities such as persons, places and organizations. Such objects may include statements about the attributes of a named entity, such as the gender of a person, or the address, url, and cuisine of a restaurant. Objects associated with named entities may also include relations between multiple named entities, such as whether a person works for a particular company.

An information extraction agent may use an opinion generation algorithm to generate an opinion associated with a given object. For example, the extraction agent may extract information related to a technical paper from multiple on-line sources, such as authorship, publication, and other information. The extraction agent could also involve a human participant using a text annotation tool to extract information from a web site, text corpus, or other sources. The extraction agent may extract information from multiple sources about restaurants, or other objects, such as the information shown in chart 200, from which the opinion aggregation system 130 may determine the presentation bias associated with each source and estimate latent properties associated with each object.

The extracted information may be stored in a database for retrieval by the opinion aggregation system 130 over the communications network 150. The extracted information may also be transmitted to the system 130 upon request or at regular intervals. As another alternative, data extraction mechanisms described herein may be performed by the system 130.

In some systems, the agent systems 110 could correspond to human users participating in a user-driven item-filtering application, such as restaurant rating or product review web sites. Objects in this context may include statements related to the various types of utility of an item, such as, the affordability of a restaurant or durability of a product. In light of the potential for varying opinions among agents, agent opinions expressed in relation to an object may be merged to obtain a global consensus associated with the object. The opinion aggregation system 130 and/or the publisher 120 may use the global consensus to identify the top items (e.g., top rated relative to the global consensus). These top items may be displayed on a web site or otherwise communicated to the participating agents by the publisher 120.

The agent systems 110 may generate different, and sometimes inconsistent, opinions in relation to the same object. Information extracted by an extraction agent may include conflicting facts in relation to, for example, the authorship of an academic article, the type of cuisine served by a restaurant, etc. Opinions generated by human agents may also vary significantly. The opinion aggregation system 130 infers latent properties associated with the source and/or object, reconciles conflicts among the opinions, and may aggregate the processed opinions to the aggregate opinion database 140. The aggregate opinion database 140 may be a database, electronic file, or other data structure separately stored and managed, incorporated into a single memory or database, distributed across several databases or other data structures, or may be logically and physically organized in many different ways.

The opinion aggregation system 130 may also determine a truth score or global consensus associated with an opinion, for example, as disclosed in U.S. application Ser. No. 11/957,779, filed Dec. 17, 2007 and issued as U.S. Pat. No. 7,895,149, which is incorporated herein by reference. A truth score may be associated with objects for which there is a truth, such as if the object related to the authorship of an article. A global consensus may be associated with objects for which there may not be an absolute truth, such as objects of a subjective nature. For example, a global consensus may be generated for opinions related to movie ratings, approval of a politician, or other such objects. The truth score associated with each object provides users with a reliable composite or aggregate of the opinions associated with the corresponding object.

The opinion aggregation system 130 may use a general probabilistic framework to estimate the source presentation format and latent target object properties using opinions associated with the target object from multiple sources. The probabilistic framework may use a Bayesian opinion generation process. The probabilistic framework facilitates the modeling of complex forms of source bias (such as the presentation format) and source-object dependencies.

The opinion aggregation system 130 may adapt to new opinions as they are generated and received. The opinion aggregation system 130 may also update the model at regular time intervals, such as each night based on the opinions received the preceding day or each weekend based on the opinions received during the preceding week.

The opinion aggregation system 130 may provide inferred object properties and other results of opinion aggregation to the publisher 120 via the communications network 150. The publisher 120 may display or otherwise provide the agent systems 110 with access to the results. The publisher 120 may provide a versatile and comprehensive opinion and object hosting model using the results associated with each target object as estimated by the system 130. The system 130 may also store the object properties and other results of the opinion aggregation on the aggregate opinion database 140 for use by the agent systems 110 or the publisher 120.

The components of the architecture 100 may be separate, may be supported on a single server or other network enabled system, or may be supported by any combination of servers or network enabled systems. The components of the architecture 100 may include, or access via the communications network 150, one or more databases for storing data, variables, parameters, statistics, programs, Web pages, search listings, advertising content, or other information related to agent submitted opinions, or other systems.

The communications network 150 may be any private or public communications network or combination of networks. The communications network 150 may be configured to couple one computing device, such as a server, system, database, or other network enabled device, to another device, enabling communication of data between the devices. The communications network 150 may generally be enabled to employ any form of computer-readable media for communicating information from one computing device to another. The communications network 150 may include one or more of a wireless network, a wired network, a local area network (LAN), a wide area network (WAN), a direct connection, such as through a Universal Serial Bus (USB) port, and may include the set of interconnected networks that make up the Internet. The communications network 150 may implement any communication method by which information may travel between computing devices.

The opinion aggregation system 130 may include a processor and a memory coupled to the processor that stores instructions that control operation of the system 130. The processor may be a programmable processor that implements instructions stored on the memory for performing the operations of the system 130 disclosed herein. It will be appreciated that the processor may be implemented in software, hardware or a combination thereof. All such logical and physical implementations of the described functionality are contemplated herein.

Specific components of the opinion aggregation system 130 may include additional or different components. The processor may be implemented as a microprocessor, microcontroller, application specific integrated circuit (ASIC), discrete logic, or a combination of other types of circuits or logic. Similarly, the memory, or memories, may be DRAM, SRAM, Flash, or any other type of memory. Parameters (e.g., object properties), databases, and other data structures may be separately stored and managed, may be incorporated into a single memory or database, or may be logically and physically organized in many different ways. Programs or instruction sets may be parts of a single program, separate programs, or distributed across several memories and processors.

Although selected aspects, features, or components of the implementations of the opinion aggregation system 130 discussed herein are depicted as being stored in memories or other data structures, all or part of the systems, including methods and/or instructions for performing such methods consistent with the real-time search system, may be stored on, distributed across, or read from other computer-readable media, for example, secondary storage devices such as hard disks, floppy disks, and CD-ROMs; a signal received from a network; or other forms of ROM or RAM either currently known or later developed.

Figure 3:
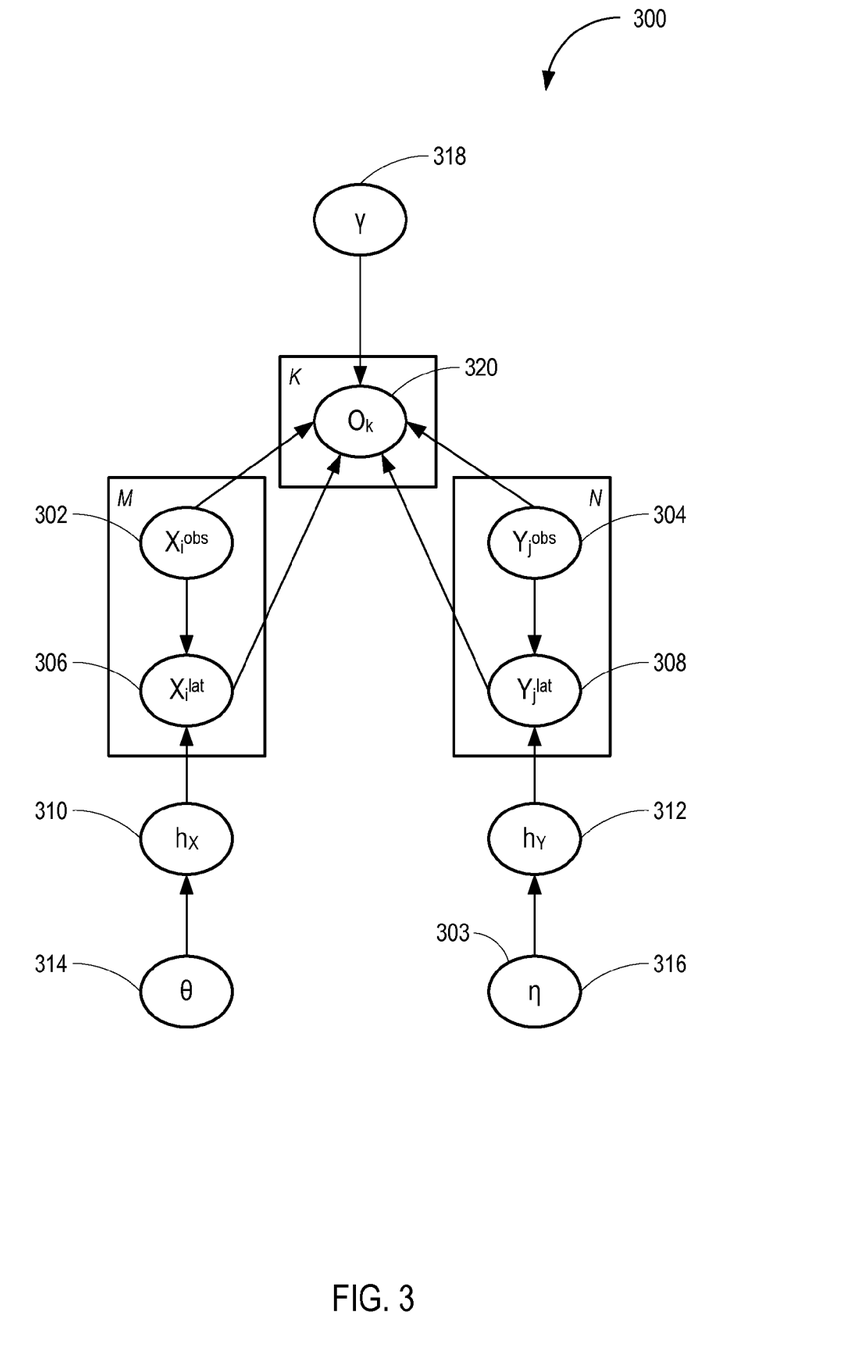
FIG. 3 shows an exemplary graphical model that represents a set of parameters and their probabilistic independencies that the opinion aggregation system may use to infer latent variables associated with an opinion.

FIG. 3 shows an exemplary graphical model 300, such as a dyadic latent factor model, that represents probabilistic dependencies that the opinion aggregation system 130 may infer about objects, sources, and their opinions. The model 300 may follow the general framework of a Bayesian system or other probabilistic models. The model 300 includes nodes 302, 304, 306, 308, 310, 312, 314, 316, 318, 320 representing model variables and parameters and conditioning arcs representing causal relationships between a parent and child nodes, the arrowhead end of a conditioning arc pointing to a child node. The nodes 302, 304, 306, 308, 310, 312, 314, 316, 318, 320 of the model 300 may correspond to observed variables or latent parameters. The latent parameters may be estimated or inferred based on the observed variables in light of the relationships between nodes.

Referring to the model 300, $S=\{s_i\}_i^{N_S}$ denotes the set of sources, $\epsilon=\{e_j\}_{j=1}^{N_E}$ denotes the set of objects, and $o=\{o_k\}_{k=1}^{N_O}$ denotes the set of opinions where each k is associated with a pair (i, j), $1 \le i \le N_S$, $1 \le i \le N_E$. In addition, I(k), J(k) denote the indices of the source and object associated with the $k^{th}$ opinion.

Nodes 302 and 304 of the model 300 correspond to observed variables $X_i^{obs}$ and $Y_j^{obs}$, respectively. The variable $X_i^{obs}$ corresponds to observed source properties while $Y_j^{obs}$ corresponds to observed object properties. Nodes 306 and 308 correspond to latent or partially observed latent random variables $X_i^{lat}$ and $Y_j^{lat}$, respectively. The variable $X_i^{lat}$ corresponds to latent source properties while $Y_j^{lat}$ corresponds to latent object properties. In the example shown in FIG. 2, observed source variables may include a url or other identification of the web site. Latent source variables may include the source presentation format of the web site. Observed object variables may include the information presented by the web site, such as the name and address of the restaurant. Latent object properties may include information about the restaurant that the web site does not provide, such as the type of cousine it serves, the restaurant's url, the restaurant's hours of operation, or other latent information about the restaurant.

An opinion aggregation system infers the source and object latent based on a probabilistic model such as the one shown in FIG. 3.

The observed variables may be retrieved from a database, directly submitted to an opinion aggregation system, extracted from other Web sites or sources, or obtained using other information retrieval and/or extraction mechanisms. The variables $X_i^{lat}$ and $Y_j^{lat}$ may correspond to the source presentation format and the target object property, respectively. In addition, $h_X$ and $h_Y$ (nodes 310 and 312, respectively) denote priors on the latent variables $\{X_i^{lat}\}_i$ and $\{Y_j^{lat}\}_j$, and may be associated with hyperparameters θ and η (nodes 314 and 316, respectively). Node 318 also corresponds to a latent random variable γ.

Each opinion $O_k$ (node 320) is generated from the fully observed features $X_i^{obs}$ and $Y_j^{obs}$, as well as the latent random variables γ, $X_i^{lat}$ and $Y_j^{lat}$. The joint distribution for all variables in the model 300 may be represented as follows:

$$p(\{O_k\}_k, \{X_i^{obs}, X_i^{lat}\}_i, \{Y_j^{obs}, Y_j^{lat}\}_j, h_X, h_Y, | \theta, \eta, \gamma) =$$

$$\prod_k p(O_k / X_i^{obs}, X_i^{lat}, Y_j^{obs}, Y_j^{lat}, \gamma)$$

$$\prod_i p(X_i^{lat}/h_X)p(X_i^{obs}) \times \times \prod_j p(Y_j^{lat}/h_Y)p(Y_j^{obs})p(h_X | \theta)p(h_Y | \eta)$$

Using the model 300, an opinion aggregation system may infer missing latent factors associated with the objects and/or sources given partial observations on some of the objects and/or sources. The opinion aggregation system also extends the application of dyadic models to complex interactions, such as in the opinion token sequences example discussed below.

As an example, consider the restaurant record extraction example from chart 200. The latent target object properties $Y_j^{lat}$ in this case correspond to the object attribute values, $Y_j^{lat}=\{RestaurantName1, \ldots \}$. The opinion aggregation system may model the latent object variables $Y_j^{lat}$ using a multinomial distribution over tokens from a suitable vocabulary T with the hyper prior $h_Y$ capturing the global properties of the attributes (e.g., the zipcode has numeric tokens), such as through the use of Dirichlet distributions, or other continuous multivariate probability distributions. The textual opinions $O_k$ may be viewed as sequences of text tokens drawn from the same vocabulary.

The source latent variables may be described using a Markov model. As the source bias in this example is in presentation format, the latent variables $X_i^{lat}$ may determine a distribution over possible presentational patterns (e.g., a probability of 0.9 that the format of the opinion begins with <tr><td> cuisine: . . . , and a 0.1 probability associated with the rest of the possible format). These probabilities may correspond to transition probabilities in a Markov model for the presentation patterns. The opinion aggregation system may use $h_X$ to capture characteristics of possible presentation formats at a global level (e.g., as a Dirichlet prior for the transition probabilities). An alternative to the Markov model may be a multinomial probability model over all possible values of $X_i^{lat}$. In addition, γ captures unaccounted global effects on the opinions. For example, γ may correspond to a distribution of irrelevant tokens in T, like HTML or punctuation delimiters, or static text (e.g., "Phone:", "Address:"). In general, an opinion aggregation system computes the most likely estimates of target object property $Y_j^{lat}$ and the hidden source bias $X_i^{lat}$.

Figure 4:
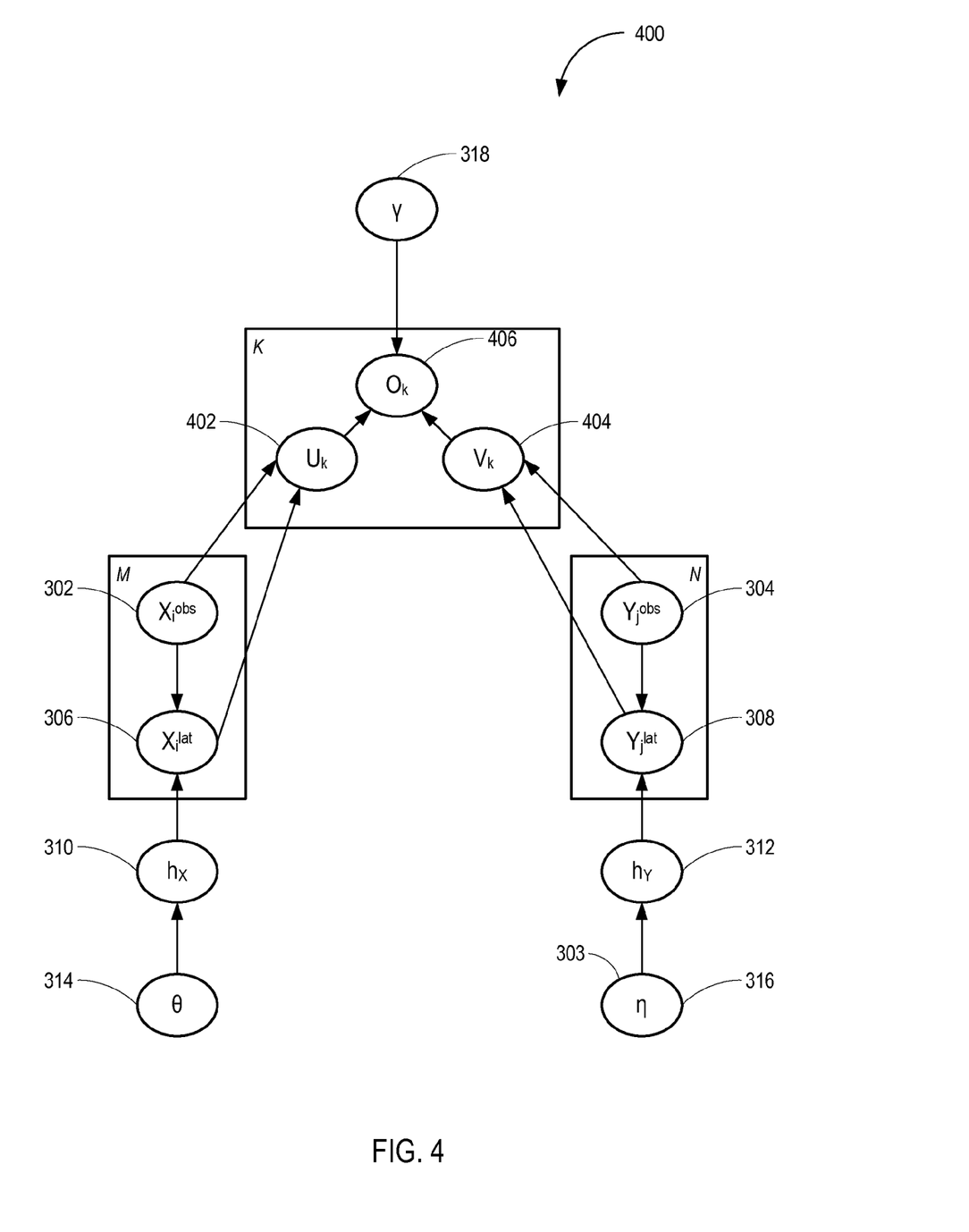
FIG. 4 shows another exemplary graphical model that represents a set of parameters and their probabilistic independencies that the opinion aggregation system may use to infer latent variables associated with an opinion.

FIG. 4 shows another exemplary graphical model 400 representing probabilistic dependencies that an opinion aggregation system may infer about objects, sources, and their opinions. The model 400 is similar to the model 300 shown in FIG. 3, but also includes additional latent variables $U_k$ and $V_k$ (nodes 402 and 404, respectively) for each observed opinion $O_k$ (node 406), which may be viewed as an instantiation of the source and object variables, respectively, for the $k^{th}$ interaction.

FIG. 5 shows an exemplary incremental EM algorithm 500 enhanced with active sets that the opinion aggregation system may use to estimate the posterior distribution of those latent variables that may lead to substantial changes in the objective function. The active set enhanced algorithm begins with creation of an active set of sources ($S_{ACT}$) and objects ($E_{ACT}$). In each iteration, the algorithm 500 considers those opinions $O_k$ for which either the corresponding source or the corresponding object is in the active set. For every $O_k$ in the active set, the algorithm 500 updates latent parameters $U_k$, $V_k$, $Y_{j(k)}^{lat}$, and $X_{i(k)}^{lat}$. If the objects or sources corresponding to $O_k$ are not in the active set, they are added to $S_{ACT}$ or $E_{ACT}$, respectively. The algorithm 500 also updates the prior parameters θ, η, and γ. As shown in FIG. 5, the algorithm 500 converges to a local minima.

As noted above, a Markov model may be used to model latent source variables, such as the source template. Using a Markov model, the opinion aggregation system may identify, for example, a starting probability and transition probabilities associated with the source template. Referring to the example shown in FIG. 2, a source template for a given source may start with a restaurant name with a probability of 0.2, or may start with a url with a probability of 0.9. If the first token is a name, the probability that the next token is a delimiter (e.g., comma, html tag, etc.) may be 0.9.

It will be appreciated that the algorithm 500 disregards the observed variables $X_i^{obs}$ and $Y_j^{obs}$, while another exemplary algorithm may use the observed variables $X_i^{obs}$ and $Y_j^{obs}$. The active set for such an algorithm may be modified relative to the algorithm 500 for which there is no supervision to use the observed parameters in addition to the latent parameters.

Figure 6:
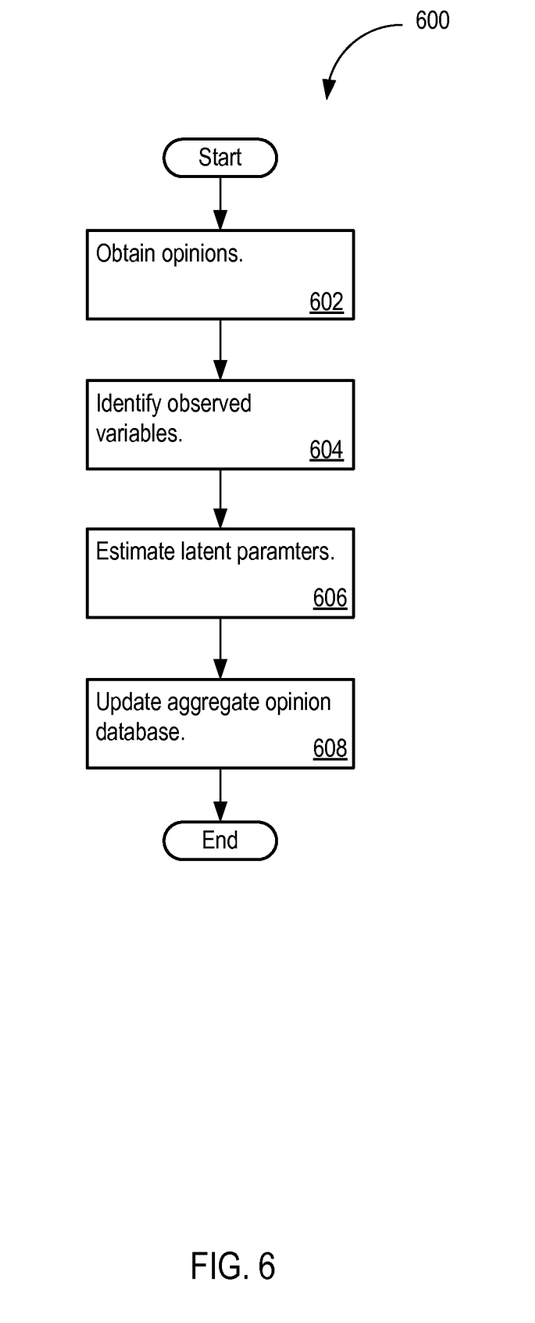
FIG. 6 shows an exemplary process that may be used to aggregate agent submitted opinions in a system for opinion aggregation.

FIG. 6 shows an exemplary process 600 that may be used to aggregate agent-submitted opinions in a system for opinion aggregation, such as in the opinion aggregation system 130. The process 600 obtains opinions generated by one or more sources (Act 602). The process 600 may extract the opinions, or instruct another extraction system to extract the opinions, from one or more web sites using an information extraction technique. The extracted data may be stored in the database or other memory structure. The process 600 may also obtain opinions from human sources, such as through electronic user submissions over the Internet through surveys, email, message boards, etc.

The process 600 identifies observed variables associated with the opinions (Act 604). The observed variables may be known variables associated with a source and/or an object. In the example shown in FIG. 2, it may be known that the restaurant corresponding to 'Object 1' serves Middle Eastern cuisine. The process 600 may use such observed variables to infer latent source and object variables. The process 600 may maintain an aggregate opinion database in which it stores and accesses opinions for which latent variables have been estimated, such as opinions for which the source presentation template has been determined. The process 600 may compare the extracted opinions with the opinions in the aggregate opinion database to identify known variables associated with the extracted opinions. For example, the source bias for a given source may have previously been estimated in an earlier process. The process 600 may use the previously estimated source bias to determine known variables associated with the opinions to be reconciled and aggregated.

The process 600 estimates the latent source and object variables based on the observed variables (Act 606). The process 600 may use a generalized Expectation-Minimization (generalized EM) algorithm enhanced with active sets, or other maximum likelihood technique enhanced with active sets, to estimate the latent variables. The generalized EM algorithm may include iterations over multiple expectation and maximization steps dealing with sets and subsets (an active set) of latent parameters. In each step, parameters in a set or subset of the parameters are assumed to be fixed and the likelihood function or an equivalent free energy function is maximized with respect to the remaining parameters. The process 600 may use multiple runs of the generalized EM algorithm or variants in conjugation with smoothing techniques, such as deterministic annealing.

The following is an instantiation of the estimation of latent variables using the graphical model 400 in the context of the record extraction example shown in FIG. 2, where the target object properties correspond to attribute values of an object and the opinions are sequences, or snippets, of text tokens. Let $A=\{a_r\}_{r=1}^{N_A}$ denote the set of object attributes such that for each object $e_j$, $[j]_1^{N_E}$, there exist latent variables $Y_j^{lat}=[Y_{jr}]_{r=1}^{N_A}$ associated with the attributes in A. $Y_{jr}$ refers to value of $r^{th}$ attribute of object $e_j$. Since as noted, this instantiation is described in the context of an extraction task, it may be assumed that the object attribute values and the tokens in the opinion sequences share the same vocabulary T. Each opinion $O_k$; $[k]_1^{N_O}$ may be represented as sequence $<O_{k1} \ldots O_{kl} \ldots O_{k,len(k)}>$ where $O_{kl} \in T$ and len(k) denotes the sequence length.

In this example, the salient source-specific bias is the sequential ordering of the object attribute values, possibly with irrelevant text content. In this context, opinion generation and aggregation may be viewed according to the following: the source provides a sequential template obtained by the process 600 over attributes A and an additional label $a_0$ denoting irrelevant tokens, the object attribute values are perturbed slightly according to some global or object-specific noise model, and the perturbed values are filled into the source template to create the opinion sequences.

Let $U_k=<U_{k1} \ldots U_{kl} \ldots >$; $U_{kl} \in A \cup \{a_0\}$ denote the sequential template generated from the source $s_i$ and let $V_k=[V_{kr}]_{r=1}^{N_A}$ denote the perturbed versions of the attribute values $[Y_{jl}]_{l=1}^{N_A}$ of object $e_j$. The process 600 may choose for $p(O_k|U_k, V_k)$ a deterministic version of the perturbation step mentioned above, i.e., the $l^{th}$ segment of the opinion sequence $<O_{k,c(l)+1}, \ldots, O_{k,c(l+1)}>=V_{kr}$, the perturbed version of $r^{th}$ attribute value, where $U_{kl}=a_r$, c(l) is the beginning position of the $l^{th}$ segment, and l goes from 1 to seglen(k), the number of segments in the template $U_k$.

It may also be assumed that the opinion sequences are tokenized such that each token is either irrelevant or corresponds to a full attribute value. In this example, there is 1-1 mapping from $U_k$ to $O_k$ and hence, $$[O_k | U_k, V_k] \sim \sum_{l=1}^{len(k)} \left[ \sum_{r=1}^{N_A} \delta(U_{kl} - a_r)\delta(O_{kl} - V_{kr}) + \delta(U_{kl} - a_0)p_{a_0}(O_{kl}) \right]$$

where $p_{a0}(O_{kl})$ represents the irrelevant token distribution, which may be, for example, a multinomial unigram model.

The process 600 may select source-specific latent variables $X_i^{lat}$ so as to generate the attribute sequence template $U_k$. The process 600 may use a first order Markov model over the states $A \cup \{a_0\}$ with the source latent variables $X_i^{lat}=(\pi_i,\tau_i)$, where $\pi_i$ and $\tau_i$ denote the initial and transition probabilities, respectively. In particular, $\pi_i=[\pi_{ir}]_{r=0}^{N_A}$ where $\pi_{ir}=p(U_{k1}=a_r)$ and $\tau_i=[\tau_{irr'}] [r]_0^{N_A}, [r']_0^{N_A}{}_{+1}$ where $\tau_{irr'}=p(U_{k,l+1}=a'_r | U_{k,l})$ and $r=N_A+1$ represents the terminal state. Thus, $$[U_k | X_i^{lat}] \sim \pi_i, U_{k1}\tau_{(i,U_{kl},N_A+1)} \prod_{i=1}^{len(k)} \tau_{i,U_{kl},U_{k,(l+1)}}$$

The priors used for $X_i^{lat}=(\pi_i,\tau_i)$, (e.g., Dirichlet priors, $\pi_i$, Dir($\alpha$), $\tau_{ir}$: Dir($\gamma_r$) [r=0] $N^A$) may lead to different variants and may be employed to constrain the sequences based on the application domain requirements, such as to, for example, disallow self-transitions among attributes.

In modeling $V_k$, the process 600 may use a perturbation model based on a distortion measure d:TxT$\mapsto \Re$ defined on the token space, $$[V_k | Y_j^{lat}] \sim \prod_{r=1}^{N_A} p(V_{kr} / Y_{jr}) = \prod_{r=1}^{N_A} c_{jr} \exp(-\beta_{jr} d(V_{kr}, Y_{jr}))$$

where $c_{jr}$ is a normalizing factor that depends on the candidates for $V_{kr}$, and $\beta_{jr}$ denotes an object-attribute specific multiplicative factor. The noise model included in the above equation is an example. It will be appreciated that other noise models may be used, such as where a different probability distribution is used in modeling $V_k$. As with source latent variables, the process 600 may select a variety of priors for the object-attribute values $Y_j^{lat}$ leading to variations in the models 300 or 400. To model $V_k$ the process 600 may use a multinomial unigram model over T for each attribute in $A_r$, i.e., $Y_{jr} \sim \text{Mult}(\eta_r, |T|)[r]_0^{N_A}$.

As noted, the inference process described above is an example that applies to FIGS. 3 and 4. The process 600 may use Algorithm 1 to infer the missing object-attribute values. It will be appreciated that the data parallelism of the incremental EM algorithm and the specific form of our graphical model, allow for parallelization of the inference process.

With the latent parameters associated with the obtained opinions estimated, the process 600 may update the aggregate opinion database with the estimated latent variables associated with each opinion (Act 608). The aggregate opinion database may be an on-line information repository that stores information about objects provided by multiple sources like web sites, public databases, user feedback, and other sources.

The aggregate opinion database may be stored on a server or other network enabled device to allow the aggregate opinion database to be accessed over the Internet or other network. The aggregate opinion database may also be stored on a computer-readable medium or on a local memory of a personal computer, handheld computing device, or other computer processing device. The process 600 may update the aggregate opinion database as opinions are obtained and corresponding latent parameters are estimated, or may alternatively communicate a database update to a user of the aggregate opinion database. The update may be stored on a computer-readable medium and delivered to a user, transmitted via email, made available for download from an extranet or internet site, or otherwise made available to a user of the aggregate opinion database, such as where the aggregate opinion database is stored locally to the user's computer, handheld device, and/or other computing devices.

The disclosed methods, processes, programs, and/or instructions may be encoded in a signal-bearing medium, a computer-readable medium such as a memory, programmed within a device such as on one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Figure 7:
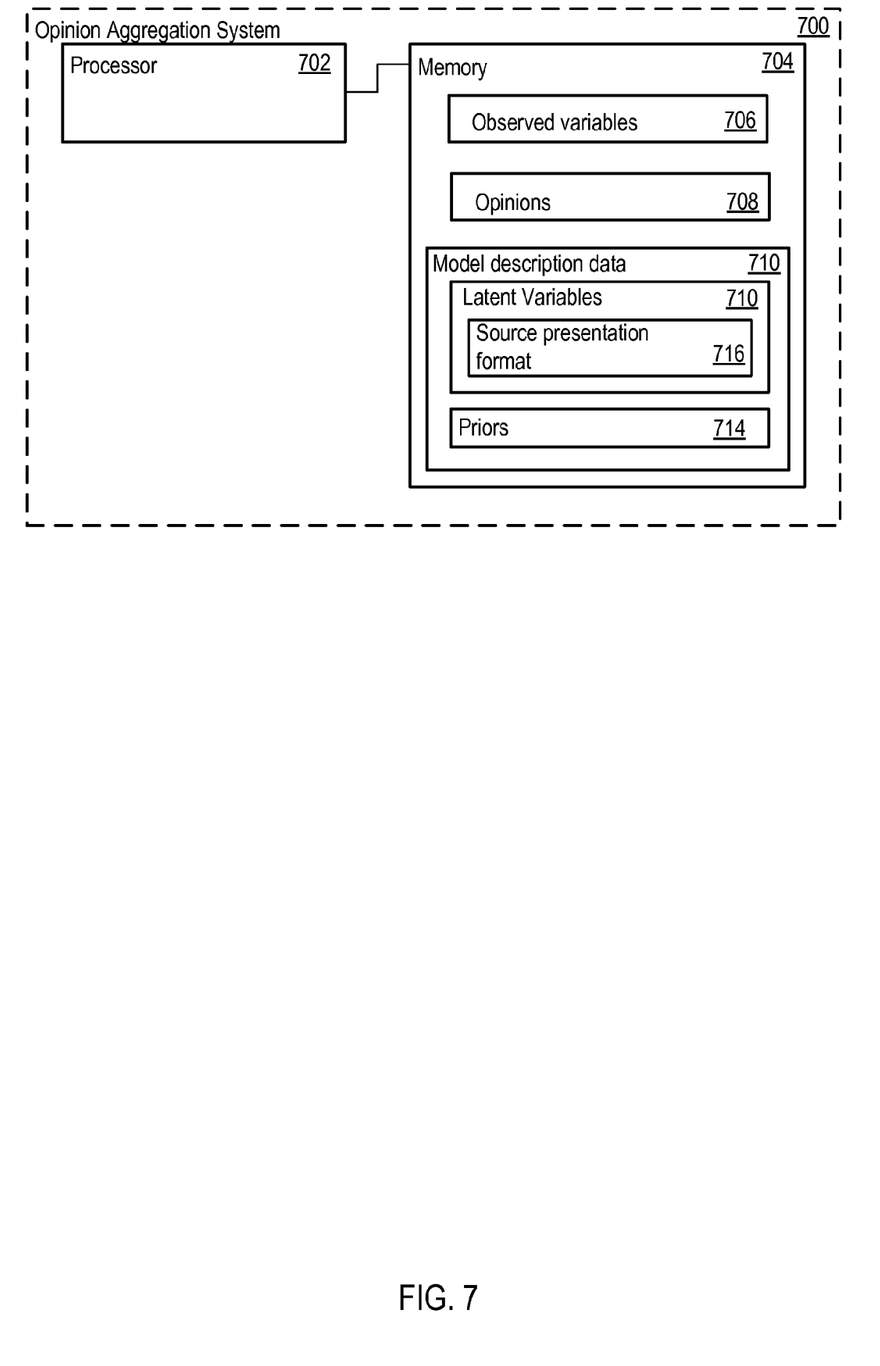
FIG. 7 shows an exemplary computer system implementing an opinion aggregation system.

FIG. 7 shows a computer system implementing an opinion aggregation system 700, including a processor 702 connected with a memory 704. The processor 702 may execute instructions stored on the memory 704 to estimate latent source and object properties associated with opinions generated by one or more sources about one or more objects and aggregate the processed opinions. For example, the processor 702 may execute instructions stored on the memory 704 that cause the system 700 to perform the process 600 described above.

The memory 704 may store observed variables 706, opinions 708, and a model description 710 that defines one or more probabilistic models including latent variables 712, such as the probabilistic models 300 or 400. The model description data 710 may define the latent variables 712, as well as independencies between the observed variables 706, opinions 708, latent variables 712, and any priors 714 associated with the object or source parameters.

The opinions 708 may be text snippets made up of a sequence of tokens, such as those shown in FIG. 2, or may take other forms. Table 1 above shows other examples of other formats the opinions may take. The latent variables 712 may include a source presentation format 716 that identifies the format by which a particular source presents data. Where the opinion 708 includes a sequence of tokens, for example, knowledge of the source presentation format allows the system 700 to interpret the meaning of each of the opinion's tokens. Once estimated, the latent variables 712 may be stored on the memory 704.

The opinion aggregation system 600 may continue to receive and store on the memory 704 new opinion data 708 generated by new or old sources in regards to new or old objects. The opinions may be received as they are submitted, or received periodically or in other time intervals. As new opinion data 708 is received, the opinion aggregation system 700 may update the observed variables 706 and estimate the source bias and other latent variables according to the new opinion data 708.

Specific components of the opinion aggregation system 700 may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, (e.g., latent object variables, observed object variables, etc.), databases, and other data structures may be separately stored and managed, may be incorporated into a single memory or database, or may be logically and physically organized in many different ways. Programs or instruction sets may be parts of a single program, separate programs, or distributed across several memories and processors.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The computer-readable medium may selectively be, but is not limited to, an electronic, magnetic, optical, electromagnetic, infrared, or semiconductor system, apparatus, device, or propagation medium. A non-exhaustive list of examples of a machine-readable medium may include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted, or otherwise processed. The processed medium may then be stored in a computer and/or machine memory.

While various embodiments of the invention have been described, it will be apparent to those of ordinary skill in the art that many more embodiments and implementations may be possible within the scope of the invention. Accordingly, the invention is not to be restricted except in light of the attached claims and their equivalents.

The invention claimed is:

1. A system for aggregating opinions generated by one or more sources in relation to an object, comprising:
   a processor; and
   a memory coupled with the processor, the memory comprising:
      a first opinion comprising a plurality of tokens;
      a probabilistic model representing the first opinion; and
      instructions that, when executed, cause the processor to:
         identify observed object variables based on content of the first opinion, wherein the observed variables comprise at least one observed source variable associated with a source of the first opinion and at least one observed object variable associated with a subject of the first opinion;
         determine whether an aggregate opinion database comprises an opinion associated with the source of the first opinion;
         based on a determination that the first opinion is associated with an opinion in the aggregate opinion database associated with the source of the first opinion, update the first opinion with latent variables associated with, but not expressly included within, the opinion in the aggregate opinion database associated with the source of the first opinion;
         estimate latent variables associated with, but not expressly included within, the first opinion based on the observed variables using a maximum likelihood technique, where estimating the latent variables comprises implementing a Markov model to estimate a source presentation format that defines a sequence of the tokens of the first opinion and estimating at least one latent object variable associated with a subject of the first opinion;

update the probabilistic model with the estimated latent variables such that the updated probabilistic model defines a probabilistic relationship between the first opinion, the observed variables, the source presentation format, and the at least one latent object variable;

update the first opinion with the estimated latent variables based on the updated probabilistic model; and update an aggregate opinion database based on the updated first opinion.

2. The system of claim 1, where the maximum likelihood technique comprises using a generalized EM algorithm that employs active sets of the objects and sources.

3. The system of claim 1, where the at least one latent object variable is inferred using a multinomial distribution.

4. A method for aggregating opinions generated by one or more sources in relation to an object, comprising executing instructions stored on a computer-readable medium that, when executed, cause a processor in an opinion aggregation system to:

obtain opinions associated with one or more objects from one or more sources, wherein each opinion comprises a plurality of tokens;

identify at least one observed object variable associated with a subject of each obtained opinion and at least one observed source variable associated with a source of each obtained opinion based on information associated with the obtained opinions;

determine whether an aggregate opinion database comprises an opinion associated with the source of each obtained opinion;

for each obtained opinion associated with an opinion in the aggregate opinion database, update the obtained opinions with latent variables associated with the corresponding opinion in the aggregate opinion database;

estimate latent variables associated with, but not expressly included within, the opinions based on the observed variables using a maximum likelihood technique, where estimating the latent variables comprises implementing a Markov model to estimate a source presentation format that defines a sequence of the tokens of the opinion and estimating at least one latent object variable associated with a subject of the opinion;

update the opinions with the estimated latent variables; and update an aggregate opinion database based on the updated opinion.

5. The method of claim 4, where the maximum likelihood technique comprises using a generalized EM algorithm that employs active sets of the objects and sources.

6. The method of claim 4, where the at least one latent object variable is inferred using a multinomial distribution.

7. A product for aggregating opinions generated by one or more sources in relation to an object, comprising:

a non-transitory computer-readable medium; and programmable instructions stored on the non-transitory computer-readable medium that, when executed, cause a processor in an opinion aggregation system to:

obtain opinions associated with one or more objects from one or more sources, wherein each opinion comprises a plurality of tokens;

identify at least one observed object variable associated with a subject of each obtained opinion and at least one observed source variable associated with a source of each obtained opinion based on information associated with the obtained opinions;

determine whether an aggregate opinion database comprises an opinion associated with the source of each obtained opinion;

for each obtained opinion associated with an opinion in the aggregate opinion database, update the obtained opinions with latent variables associated with the corresponding opinion in the aggregate opinion database;

estimate latent variables associated with, but not expressly included within, the opinion based on the observed variables using a maximum likelihood technique, where estimating the latent variables comprises implementing a Markov model to estimate a source presentation format that defines a sequence of the tokens of the opinion and estimating at least one latent object variable associated with a subject of the opinion;

update the opinions with the estimated latent variables; and update an aggregate opinion database based on the updated opinion.

8. The product of claim 7, where the maximum likelihood technique comprises using a generalized EM algorithm that employs active sets of the objects and sources.

* * * * *